United States Patent [19]

Faulstich

[11] Patent Number: 4,954,027

[45] Date of Patent: Sep. 4, 1990

[54] PROCESS FOR THE DISCONTINUOUS PROFILE GRINDING OR PROFILE MILLING OF GEAR WHEELS

[75] Inventor: Ingo Faulstich, Ludwigsburg, Fed. Rep. of Germany

[73] Assignee: Hermann Pfauter GmbH & Co., Ludwigsburg, Fed. Rep. of Germany

[21] Appl. No.: 350,897

[22] Filed: May 12, 1989

[30] Foreign Application Priority Data

May 12, 1988 [DE] Fed. Rep. of Germany ....... 3816270

[51] Int. Cl.$^5$ .............................. B23F 5/20; B24B 1/00
[52] U.S. Cl. ....................................... 409/26; 51/287; 409/51
[58] Field of Search ........................ 409/51, 26, 61, 50, 409/38, 12; 51/956 H, 123 G, 52 R, 287, DIG. 1

[56] References Cited

U.S. PATENT DOCUMENTS 3,986,305 10/1976 Gunter ................................. 51/287

FOREIGN PATENT DOCUMENTS 3731699 4/1988 Fed. Rep. of Germany ........ 51/287
141473 5/1980 German Democratic Rep. ... 409/12
52-37284 3/1977 Japan ..................................... 409/12

*Primary Examiner*—William Briggs
*Attorney, Agent, or Firm*—Foley & Lardner, Schwartz, Jeffery, Schwaab, Mack, Blumenthal & Evans

[57] ABSTRACT

A process for the discontinuous profile grinding or milling of gear wheels with wheel-type or shank-type tools which includes setting approximate parameters for the workpiece to be worked by the tool so as to avoid large profile deviations, determining by calculation or trial the profile of the workpiece following work thereon, comparing the work profile with the predetermined profile of the finished workpiece, and resetting the parameters as necessary to correspond the actual work profile with the required profile for the workpiece.

3 Claims, 4 Drawing Sheets

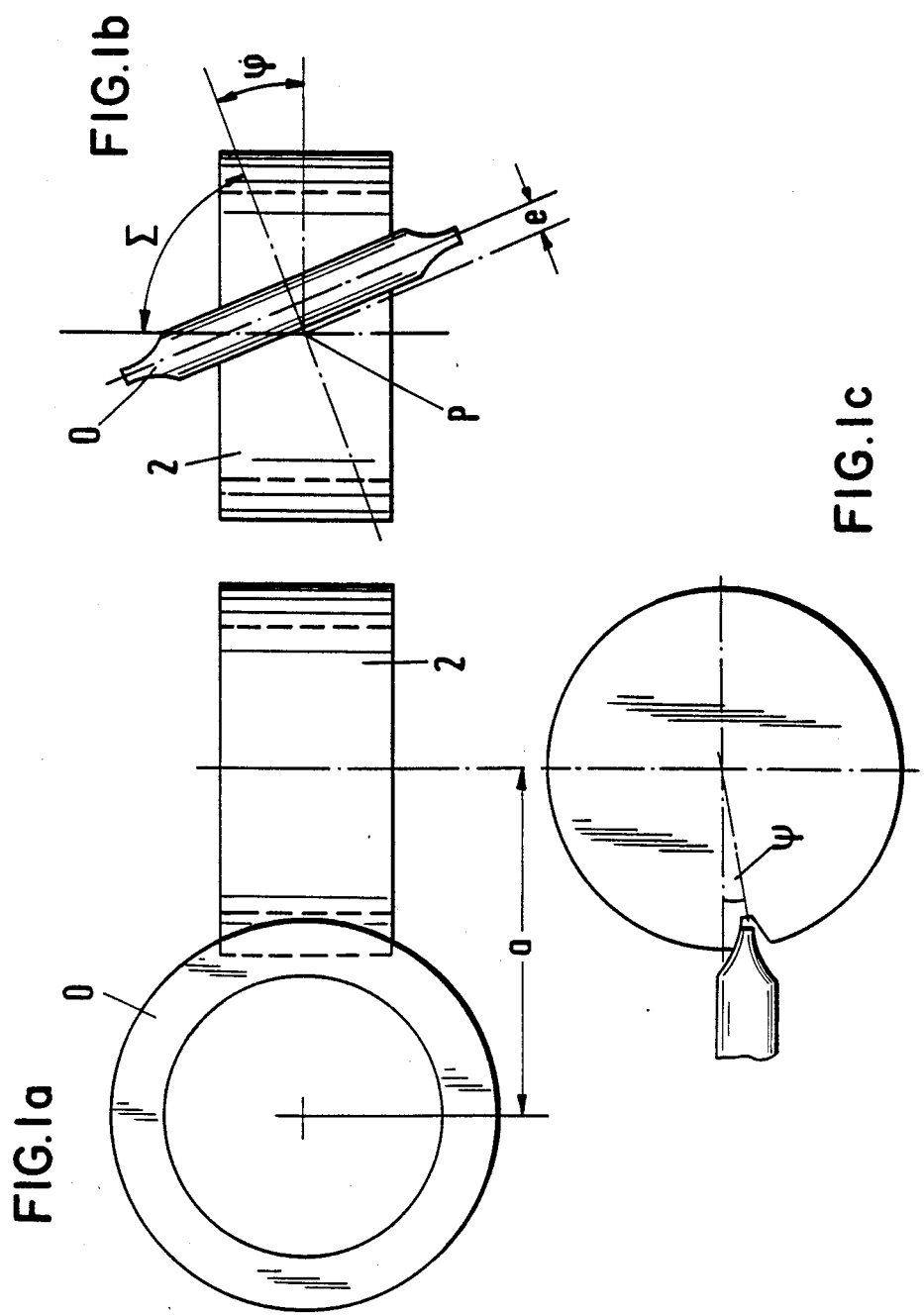

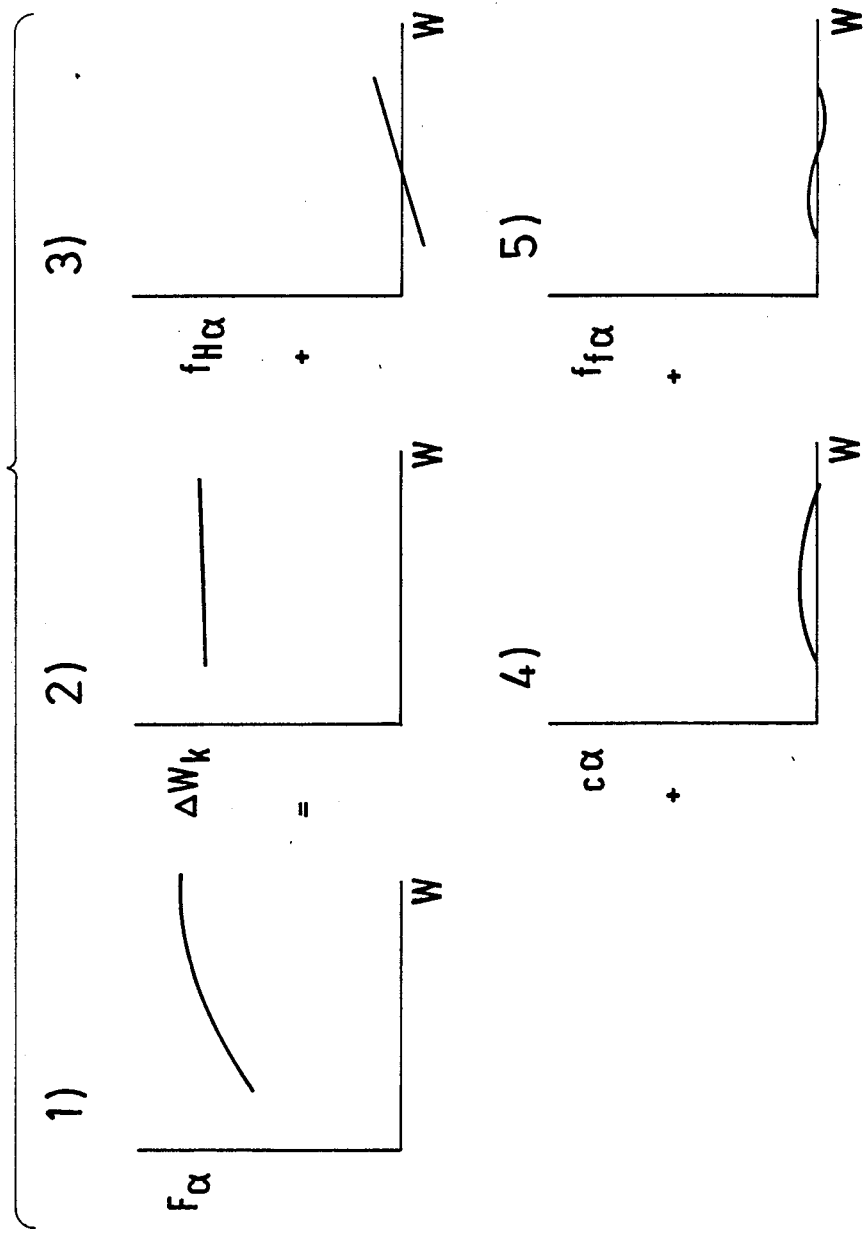

PROCESS FOR THE DISCONTINUOUS PROFILE GRINDING OR PROFILE MILLING OF GEAR WHEELS

BACKGROUND OF THE INVENTION

The invention relates to a process for the discontinuous profile grinding or profile milling of gear wheels by wheel-type or shank-type tools.

It is generally known that the process of profile grinding of cylinder gears with a wheel-type tool requires strictly workpiece-specific tools (T. Bausch, *Zahnradfertigung* [Gear Wheel Production], page 434, 1986, published by Expert Verlag). In order to be able to work the flanks of cylinder gears with different toothing geometry, tools with different geometry are necessary. The trueing of corresponding grinding wheels (*Jahrbuch Schleifen, Honen, Lappen und Polieren* [Grinding, Honing, Lapping and Polishing Annual], 51st Edition: Prof. Dr.-Ing. J. Loomann, Profilschleifen von Schrägstirnrädern: Geometrische Grundlagen-Kontaktverhältnisse-Abrichtgerät [Profile Grinding of Helical Gears: Geometrical Principles-Contact Relationships-Trueing Device], pages 180 to 193, 1982, published by Vulkan-Verlag, Essen) has so far not been able to establish itself as general practice: consequently, depending on the range of parts, a greater or lesser number of differently designed wheels are required. The procurement of new wheels, but also the reconditioning of no longer usable wheels (recoating) requires time. The situation described here results in several disadvantages of profile grinding with wheels which cannot be trued precisely, or only with difficulty or not adequately; these relate to the costs—at the moment a specially designed tool is required for each workpiece design—and the prompt provision of the tools. In particular, problems arise if the tool does not match the workpiece toothing, for example, because the workpiece data was not correctly given or the tool was not correctly produced. Great problems can occur if a tool is damaged but no replacement is available. The points touched on here have special significance in the area of single and small batch production. The problems described here also exist in the working of cylinder gears by profile grinding or profile milling with shank-type tools.

SUMMARY OF THE INVENTION

It is therefore an object of the invention to increase the flexibility of the profile grinding or profile milling of gear wheels, without providing the tool with an altered profile.

According to the invention, the solution achieving the object is based on the realization that the workpiece profile described above can only be produced without any deviations under ideal preconditions if, during grinding or milling, the tool assumes the position relative to the workpiece on which the design of the tool profile is based and that deviations from this position lead to profile deviations and deviations in the chordal dimensions or the workpiece. If the interrelationships are investigated more closely, it is realized that profile angle deviations on the workpiece in particular can be produced by an alteration of the tool setting parameters. It is known, however, that profile angle deviations can be converted into base circle deviations; see, for example, DIN 3960. Thus, from an alteration of the setting parameters, an altered base circle is obtained. The profile produced can therefore be understood as a profile of a toothing which was not based on the design of the tool.

It is proposed to use the specific alteration of the setting parameters of center-to-center distance (or profile distance) a, eccentricity e of the tool, and swiveling angle $\zeta$ for use of the tool not designed for the toothing to be worked to minimize the profile deviations to be expected on the workpiece, and to bring the required chordal dimension $W_k$ to the required value by means of an adaptation of the initial angle of rotation $\psi$. The meaning of the setting parameters in the case of wheel-type tools is illustrated by FIG. 1. The center-to-center distance a is the distance between the axes of the tool 0 and the workpiece 2. The eccentricity e is understood as being the offset of the tool 0 in the direction of its axis with respect to the distance from the crossed-axes point P used as a basis in design. In the case of known processes, the eccentricity e is zero or, at most, a few hundredths of a millimeter. In the case of the process according to the invention, the eccentricity e is to be specifically set greater by powers of ten, that is, in the millimeter range. The swiveling angle $\zeta$ becomes 90 degrees minus the crossed-axes angle $\Sigma$. The initial angle of rotation $\psi$ is the angle between the center of the workpiece tooth space and the shortest distance joining the axes of tool 0 and workpiece 2.

In the event that the profile deviations to be expected use up too much of the allowable profile deviation, the workpiece profile is to be subdivided into two or more regions, and then worked in separate grinding passes with different setting parameters. Consequently, a precondition for a successful employment of the process is the knowledge of the quantitative influence of the setting parameters on the profile of the workpiece and a strategy for the elimination of these deviations.

It is conceivable to determine the influence of the setting parameters on the profile approximately by trial and error; however, this procedure is time-consuming and expensive. Calculation of the individual influences is recommended.

Further features of the invention emerge from the description which follows, and the application drawings.

BRIEF DESCRIPTION OF THE APPLICATION DRAWINGS

The invention is explained in more detail with reference to an exemplary embodiment represented in the drawing, in which:

FIG. 1a through 1c show in diagrammatic side, end and plan representations the various setting parameters of center-to-center distance a, eccentricity e, swiveling angle $\zeta$, initial angle of rotation $\psi$ and crossed-axes angle $\Sigma$ between a wheel-type tool and the workpiece.

FIG. 2 shows by graph representation the breakdown of the overall profile deviation $F_\alpha$ over the contact rolling path W into the components of chordal dimension deviation $\Delta W_k$, profile angle deviation $f_{H\alpha}$, crowning $c_\alpha$, and profile form deviation $f_{f\alpha}$.

Figure 3:
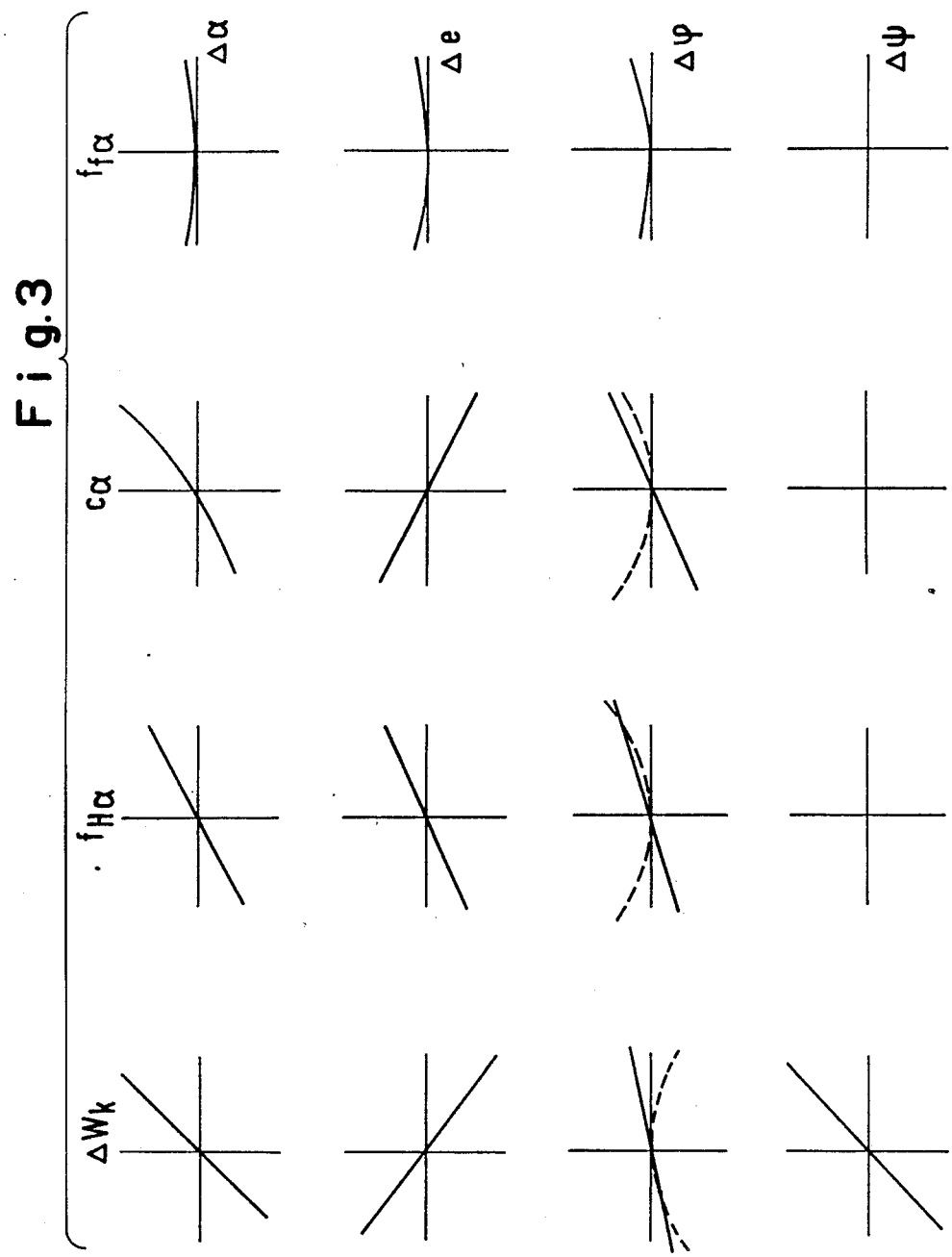

FIG. 3 shows by similar graph representation the influence of the center-to-center distance a, the eccentricity e, the swiveling angle $\zeta$, and the initial angle of rotation $\psi$ on the chordal dimension deviation $\Delta W_k$, the profile angle deviation $f_{H\alpha}$, the crowning $c_\alpha$ and the profile form deviation $f_{f\alpha}$ for a straight-toothed workpiece and for a helically-toothed workpiece, working with a wheel-type tool.

DETAILED DESCRIPTION OF THE PREFERRED EMBODIMENTS

In the calculation of the individual influences, the production process is simulated. First of all, the grinding or milling of the workpiece toothing with a tool 0 which is designed for a workpiece 2 with similar geometry is simulated. For this purpose, the center-to-center distance or profile distance a and the swiveling angle $\zeta$ are chosen, for example, such that tool 0 and workpiece 2 would match each other precisely. Then the workpiece profile to be expected is calculated and this is compared with the required profile. For this comparison, the overall profile deviation $F_\alpha$ is broken down into four components, namely, a chordal dimension deviation $\Delta W_k$, the components known from gear measurement techniques of profile angle deviation $f_{H\alpha}$, crowning $c_\alpha$, and profile form deviation $f_{f\alpha}$. The crowning is described here in the profile diagram by a quadratic parabola.

Subsequently, the setting parameters a, e, $\zeta$, $\psi$ are altered and the process described above is repeated. In this case, different results are obtained than in the first run. From the comparison of these results, it is deduced in which direction the setting parameters are to be altered for the next calculation. The procedure is repeated often enough until suitable setting parameters are found. Normally, this is the case when the profile angle deviation $f_{H\alpha}$ is equal to 0 and the crowning $c_\alpha$ and the profile form deviation $f_{f\alpha}$ lie within given tolerances.

If the tolerances described above cannot be maintained and there is no possibly better suited tool 0 available, the working of a flank of the tooth must be performed in two or more passes. For this purpose, the required workpiece profile is broken down into two (or correspondingly more) regions and the process described here is used separately on each of these regions.

Once the setting parameters have been found on the computer, working on the machine can take place. Tool 0 and workpiece 2 are of course to be set to these parameters for this.

The proposed process also offers the possibility of producing tip and/or root relief with an unmodified wheel 0. For this purpose, the individual regions of each flank are to be worked in separate passes with different setting parameters.

The process also offers the possibility of producing flanks of teeth with crowning.

Particularly advantageous is the fact that the amounts of the tip and root relief, and in certain limits the amount of crowning, can be chosen by means of machine settings, that is, not by means of correspondingly profiled tools. The process offers the precondition allowing wheels 0 for a certain field of application to be kept in stock as standard, so that the coating or the recoating can be performed independently of the current working job.

Tools for profile milling have the same geometry as the corresponding tools for profile grinding. The production kinematics of both processes is the same. The proposed process can therefore also be used in profile milling with wheel-type tools.

In trueing systems with which the theoretically required wheel profile cannot be produced, a distinct improvement in work results can be achieved by means of the proposed process. Such cases exist whenever the wheel 0 is not trued under continuous-path control but, for example, by means of rollers which are set correspondingly with respect to the wheel 0 for trueing, or if the wheel 0 is trued using templates. Such processes still have advantages at the moment over trueing by means of numerically controlled equipment; this applies in particular to applications in which particularly high requirements are demanded of the surface roughness of the workpiece flanks.

The process is explained below with reference to FIGS. 2 and 3. The subfigure 1 in FIG. 2 shows the overall profile deviation $f_\alpha$ over the contact rolling path W. As subfigures 2 to 5 in FIG. 2 show, this overall profile deviation $F_\alpha$ is broken down into the four components of chordal dimension deviation $\Delta W_k$, profile angle deviation $f_{H\alpha}$, crowning $c_\alpha$ and profile form deviation $f_{f\alpha}$. These variables, indicated in subfigures 2 to 5 of FIG. 2, can be influenced by the described setting parameters of center-to-center and profile distance a, respectively, eccentricity e, swiveling angle $\zeta$, and initial angle of rotation $\psi$, as FIG. 3 shows.

FIG. 3 reproduces the relationships for helically-toothed (solid lines) and straight-toothed (broken lines) workpieces. On the abscissa, it does not include the setting parameters themselves but their alteration with respect to the initial state. FIG. 3 shows the effects of the setting parameters $\Delta a$, $\Delta e$, $\Delta \zeta$ and $\Delta \psi$ on the variables $\Delta W_k$, $f_{H\alpha}$, $c_\alpha$ and $f_{f\alpha}$. The chordal dimension deviation $\Delta W_k$ can be set most simply by means of the setting parameter $\Delta \psi$, that is by means of a rotation of the workpiece 2, because $\Delta \psi$ has no influence on the other variables $f_{H\alpha}$, $c_\alpha$ and $f_{f\alpha}$. FIG. 3 also shows that the variables $f_{H\alpha}$ and $c\alpha$ can be optimized by the setting parameters $\Delta a$, $\Delta e$ and $\Delta \zeta$. In principle, the variable $f_{H\alpha}$ can be made 0. The remaining variables $c_\alpha$ and $f_{f\alpha}$ limit the field of application of the process.

The basic process is not restricted to wheel-type tools; it can also be carried out with shank-type tools.

Figure 1E:
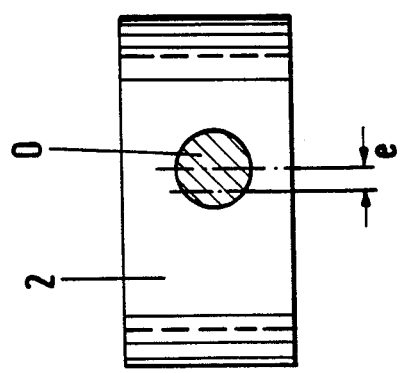
FIG. 1d through 1f show in diagrammatic side, end and plan representations the various setting parameters of profile distance a, eccentricity e, swiveling angle $\zeta$, initial angle of rotation $\psi$ and crossed-axes angle $\Sigma$ between a shank-type tool and the workpiece.
Figure 1D:
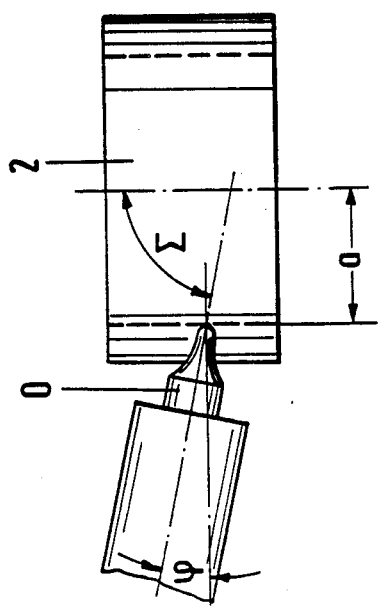
Figure 1F:
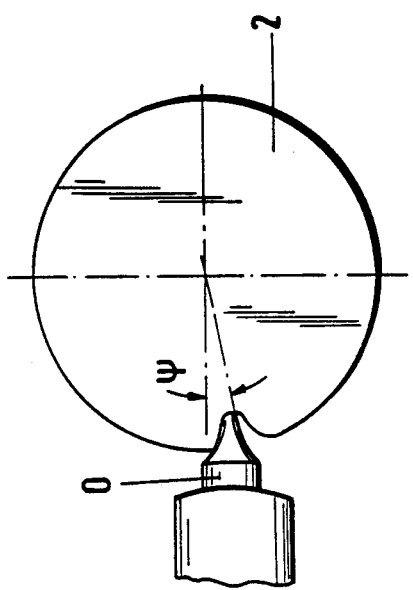

When using shank-type tools, there are similar interrelationships between the tool setting parameters and the workpiece profile. The parameter a just has a slightly different meaning here than if a wheel-type tool is used. When using a shank-type tool, a is the distance of a reference point on the tool axis from the workpiece axis, measured in the direction of the machine longitudinal axis, that is, where e=0 and $\zeta$=0, measured in the direction of the tool axis; compare FIGS. 1d through 1f.

When using shank-type tools, a characterizes the distance of the tool profile to the workpiece axis. The distance is measured in a surface plane containing the workpiece axis and lying perpendicular to the eccentricity. On this surface plane the tool profile is projected. The profile distance is the distance of a reference point on the tool axis to the workpiece axis in the surface plane described above. Which point is chosen as reference point makes no difference. It is important only that the tool profile with regard to this point is known for the simulation of the production process and that the tool with regard to this point is positioned on the machine.

The following points should be made concerning the swiveling angle when working with a shank-type tool:

the swiveling angle ζ here also becomes 90 degrees minus crossed-axes angle Σ. In the conventional use of shank-type tools, the swiveling angle is at least approximately zero. To achieve the desired influence on the workpiece profile, this angle is normally not zero.

What is claimed is:

1. A process for the discontinuous profile grinding or milling of gear wheels with wheel-type or shank-type tools in which the flanks of a workpiece are worked with one tool or with a tool for the right and left flanks in separate operations, comprising the steps of:
   (a) setting approximate parameters a, e, ζ and ψ for the workpiece to be worked by the tool so as to avoid large profile deviations, wherein
      a is the center-to-center or profile distance between predetermined points on the tool and workpiece,
      e is the eccentricity of the tool,
      ζ is the swiveling angle of the tool, and
      ψ is the initial angle of rotation of the tool;
   (b) determining by calculation or trial the profile of the workpiece resulting from work on the workpiece by the tool based on said approximate parameters;
   (c) providing a predetermined required profile for the finished workpiece;
   (d) comparing said work results and profile with the required profile of the finished workpiece;
   (e) altering said setting parameters;
   (f) determining the work profile of the workpiece based on the altered setting parameters, and
   (g) repeating the process in the aforesaid manner until the work profile corresponds with the required profile for the finished workpiece.

2. The process according to claim 1, characterized in that a tip and/or root relief is produced with a tool which was designed for a workpiece without profile modification, with altered setting parameters in each additional operation.

3. The process according to claim 1, characterized in that a desired amount of crowning is produced with a tool designed for a workpiece without crowning or for a workpiece with different crowning, by selective setting of the tool with respect to the workpiece.

* * * * *